United States Patent [19]

Clark et al.

[11] Patent Number: 5,117,486

[45] Date of Patent: May 26, 1992

[54] BUFFER FOR PACKETIZING BLOCK OF DATA WITH DIFFERENT SIZES AND RATES RECEIVED FROM FIRST PROCESSOR BEFORE TRANSFERRING TO SECOND PROCESSOR

[75] Inventors: Alan R. Clark; Joseph P. Higham, both of Endicot, N.Y.; James E. Hughes, Hallstead, Pa.; James W. Valashinas, Endicott, N.Y.

[73] Assignee: International Business Machines Corp., Armonk, N.Y.

[21] Appl. No.: 341,503

[22] Filed: Apr. 21, 1989

[51] Int. Cl.⁵ .............................................. G06F 13/00
[52] U.S. Cl. ............................. 395/250; 364/DIG. 2; 364/230.5; 364/239.7; 364/926; 364/939.3; 364/DIG. 1; 395/275
[58] Field of Search .................. 364/200, 900; 395/250, 395/275

[56] References Cited

U.S. PATENT DOCUMENTS

| | | | |
|---|---|---|---|
| 4,099,231 | 7/1978 | Kotok et al. | 364/200 |
| 4,144,562 | 3/1979 | Cooper | 364/200 |
| 4,349,875 | 9/1982 | Tada | 364/200 |
| 4,467,419 | 8/1984 | Wakai | 364/200 |
| 4,571,671 | 2/1986 | Burns et al. | 364/200 |
| 4,594,653 | 6/1986 | Iwashita et al. | 364/200 |
| 4,788,660 | 11/1988 | Arizono | 364/900 |
| 4,821,185 | 4/1989 | Esposito | 364/200 |
| 4,860,244 | 8/1989 | Bruckert et al. | 364/900 |
| 4,864,496 | 9/1989 | Triolo et al. | 364/200 |
| 4,956,771 | 9/1990 | Neustaedter | 364/200 |
| 5,038,277 | 8/1991 | Altman et al. | 364/200 |

*Primary Examiner*—Thomas C. Lee
*Assistant Examiner*—Krisna Lim
*Attorney, Agent, or Firm*—Richard E. Bee; Arthur J. Samodovitz

[57] ABSTRACT

A bus-to-bus adapter is provided for coupling the input/output bus of a first data processor to the input/output bus of a second and different type of data processor. The adapter enables the transfer of data and messages from the first processor to the second processor and vice versa. The adapter includes a buffer storage unit and control logic for enabling multiple data buffers to be provided for enabling multiple independent data transfer operations to be performed in a concurrent manner. The control logic also includes a mechanism for allowing the reading out of data from a data buffer to begin before such data buffer has received all of its incoming data. The adapter further includes a programmable service time allocation mechanism for limiting message service time relative to data transfer service time and for providing different amounts of data transfer service time for different ones of the multiple data buffers.

5 Claims, 9 Drawing Sheets

DOWN MESSAGE CONTROL BLOCK —40

| | BYTE 1 | BYTE 2 | BYTE 3 | BYTE 4 |
|---|---|---|---|---|
| WORD 1 | | | COMMAND | |
| WORD 2 | | | CHANNEL ADDRESS | DEVICE ADDRESS |
| WORD 3 (CAW) | KEY | 0000 | SYSTEM/370 COMMAND ADDRESS | |
| WORD 4 | ADAPTER STATUS | TRANSFER STATUS | | |

FIG.3

UP MESSAGE CONTROL BLOCK —41

| | BYTE 1 | BYTE 2 | BYTE 3 | BYTE 4 |
|---|---|---|---|---|
| WORD 5 | | CHANNEL ADDRESS | DEVICE ADDRESS | |
| CSW | KEY | 0000 | SYSTEM/370 COMMAND ADDRESS | |
| | UNIT STATUS | CHANNEL STATUS | BYTE COUNT | |
| WORD 8 | ADAPTER STATUS | G O / TRANSFER STATUS | COMMAND | IOP |

FIG.4

DATA TRANSFER CONTROL BLOCK #1 —42

| | BYTE 1 | BYTE 2 | BYTE 3 | BYTE 4 |
|---|---|---|---|---|
| WORD 9 | KEY | SYSTEM/370 DATA ADDRESS | | |
| WORD 10 | BYTE COUNT | | COMMAND | IOP |
| WORD 11 | ADAPTER STATUS | G O / TRANSFER STATUS | CHANNEL ADDRESS | DEVICE ADDRESS |
| WORD 12 | | REPEAT COUNT | | DATA TRANSFER TIMEOUT |
| WORD 13 | DATA BUFFER BEGIN ADDRESS | | DATA BUFFER END ADDRESS | |

FIG.5

DATA TRANSFER CONTROL LOGIC 70

BUFFER FOR PACKETIZING BLOCK OF DATA WITH DIFFERENT SIZES AND RATES RECEIVED FROM FIRST PROCESSOR BEFORE TRANSFERRING TO SECOND PROCESSOR

TECHNICAL FIELD

This invention relates to bus-to-bus adapters for coupling two different data processors to one another so that data can be transferred from one processor to the other and vice versa. This invention is particularly useful for the case where the two data processors are constructed in accordance with two substantially different computer architectures.

BACKGROUND OF THE INVENTION

In data interfaces between two data processors, it is known to employ a buffer storage mechanism for purposes of buffering the flow of data from one processor to the other and vice versa. A block of data to be transferred is moved from one processor and stored into the buffer storage mechanism. Thereafter, this block of data is read out of the buffer storage mechanism and transferred to the second data processor. These transfers into and out of the buffer storage mechanism cannot occur simultaneously because all of the arriving data must be present in the buffer storage before the buffer emptying process can begin. Processor-to-processor data transfer methods which employ this buffer storage technique are sometimes referred to as "store and forward" methods or "mailbox" methods.

While the known methods are generally satisfactory, there is nevertheless room for improvement. In particular, it is desirable to provide processor-to-processor interfaces which enable faster data transfer rates between t e two processors. It is further desirable to provide now and improved interface mechanisms which enables multiple independent processor-to-processor operations to occur in a concurrent manner.

SUMMARY OF THE INVENTION

In accordance with the present invention, there is provided a new and improved bus-to-bus adapter unit for coupling the input/output (I/O) bus of a first data processor to the input/output (I/O) of a second data processor for enabling fast and efficient transfers of messages and data from one processor to the other. This bus-to-bus adapter includes a buffer storage mechanism for temporarily storing the data during its passage from one processor to the other. A control mechanism is provided for enabling multiple independent data buffer areas to be established in the buffer storage for enabling multiple independent processor-to-processor storage operations to occur concurrently with one another. These transfer operations need not be in the same direction. Some may move data from the first processor to the second, while others may move data in the opposite direction. This multiple buffer technique increases the data transfer flexibility where different types of data sources are associated with one or both of the processors.

Another feature of this new bus-to-bus adapter is the provision of a mechanism for enabling different amounts of service time to be allocate to different ones of plural independent but concurrent transfer operations. This enables higher priority transfer operations to be processed at faster rates than lower priority transfer operations.

This new and improved bus-to-bus adapter also includes a mechanism for enabling data retrieval from a particular buffer storage area to begin before all incoming data for that buffer storage area has been received by the buffer. This overlaps the transfer in and the transfer out of data from this given buffer storage area. This increases the rate at which data can be transferred from one processor to the other.

A processor-to-processor interface adapter constructed in accordance with the present invention is particularly useful for the case where the two processors and their I/O busses are constructed in accordance with two substantially different and basically incompatible computer architectures.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings:

FIG. 3 shows in greater detail the contents of the down message control block of FIG. 2;

FIG. 4 shows in greater detail the contents of the up message control block of FIG. 2;

FIG. 5 shows in greater detail the contents of the data transfer control block #1 of FIG. 2;

DESCRIPTION OF THE PREFERRED EMBODIMENT

Figure 1:
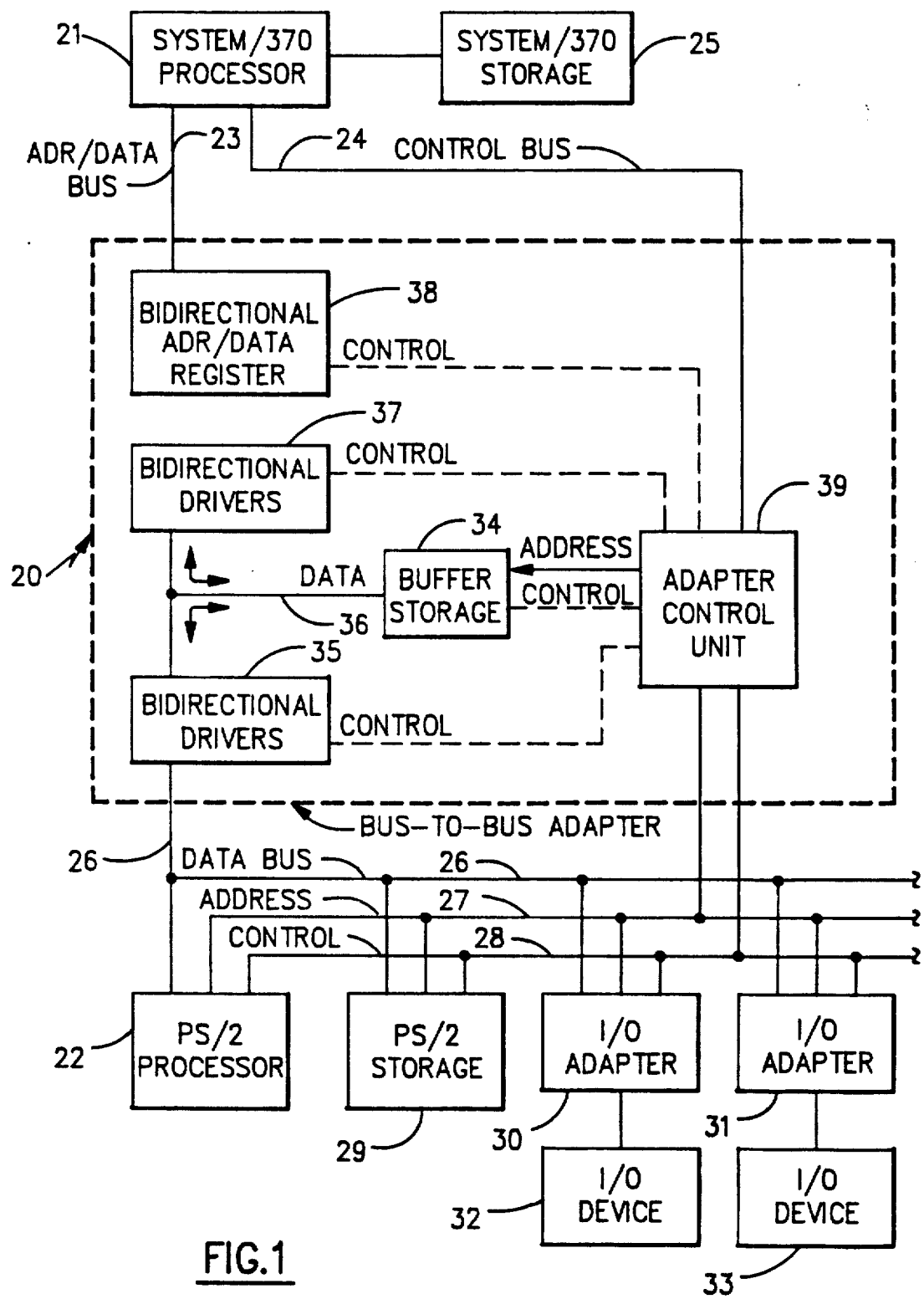
FIG. 1 shows a general block diagram of a two processor data processing system including a bus-to-bus adapter constructed in accordance with the present invention.

Referring to FIG. 1, there is shown a bus-to-bus adapter 20 for coupling the input/output (I/O) bus of a first data processor 21 to the input/output (I/O) bus of a second data processor 22. The first data processor 21 may be, for example, an IBM type System/370 processor. A detailed description of the architecture and machine functions provided by a System/370 processor are described in a technical manual entitled *IBM System/370 Principles of Operation*, Eleventh Edition (Sept. 1987), published by IBM Corporation of Armonk N.Y., IBM Order No. GA22-7000. The second data processor 22 may be, for example, an IBM type Personal System/2 (PS/2) Model 80 processor. Such processor is described in a technical publication entitled "*Personal System/2 Model 80 Technical Reference*, published by IBM Corporation of Armonk N.Y., IBM Order No. S68X-2256.

The I/O bus for the System/370 processor 21 includes a multi-line address/data bus 23 and a multi-line control bus 24. A System/370 storage unit 25 is connected to the System/370 processor 21.

The I/O bus for the Personal System/2 (PS/2) processor 22 includes a multi-line data bus 26, a multi-line address bus 27 and a multi-line control bus 28. A PS/2 storage unit 29 is connected to this I/O bus. Various peripheral units or I/O units are also coupled to the PS/2 I/O bus 26–28. For example, first and second I/O adapters 30 and 31 are coupled to this PS/2 bus 26–28. I/O devices 32 and 33 are are coupled to respective ones of the I/O adapters 30 and 31.

The bus-to-bus adapter 20 includes a buffer storage unit 34 for storing data supplied by either one of the data processors 21 and 22 and for transferring such data to the other one of the data processors 21 and 22. The data flow path from the PS/2 processor 22 to the buffer storage 34 is by way of PS/2 data bus 26, bidirectional drivers 35, and buffer data bus 36. The data transfer path between the buffer storage 34 and the System 370 processor 21 is provided by buffer data bus 36, bidirectional drivers 37, bidirectional address/data register 38 and the System 370 address/data bus 23. Both of these data flow paths are bidirectional in nature. Data and messages may flow from the System 370 processor 21 to the buffer storage 34 or vice versa. Similarly, data and messages may flow from the PS/2 processor 22 to the buffer storage 34 or vice versa.

Data or messages are never allowed to flow directly from the System/370 processor 21 to the PS/2 processor 22 or vice versa. All and all messages data must first be stored in the buffer storage 34 and then read out and supplied to the second processor. The two sets of bidirectional drivers 35 and 37 are never both active at the same time. If bidirectional drivers 35 are turned on for data transfer purposes, then bidirectional drivers 37 are turned off and vice versa.

One reason for using the buffer storage 34 as an intermediary is the fact that the System 370 I/O bus 23–24 has a considerably different architecture from the PS/2 I/O bus 26–28. They have different numbers of data lines, different operating cycle requirements, etc. Thus, it is necessary to reformat or reorganize the data before sending it on to the next data processor.

The bus-to-bus adapter 20 also includes an adapter control unit 39 for controlling the operation of the other units in the adapter 20. The adapter control unit 39 controls, for example, the addressing and read verses write (R/W) status of the buffer storage 34. It also controls the operational status and flow direction of the bidirectional drivers 35 and 36 and the address/data register 38. The adapter control unit 39 receives appropriate control signals from the System/370 processor 21 via control bus 24 and from the PS/2 processor 22 via its control bus 28. It also receives address information from the PS/2 processor 22 via its address bus 27.

Figure 2:
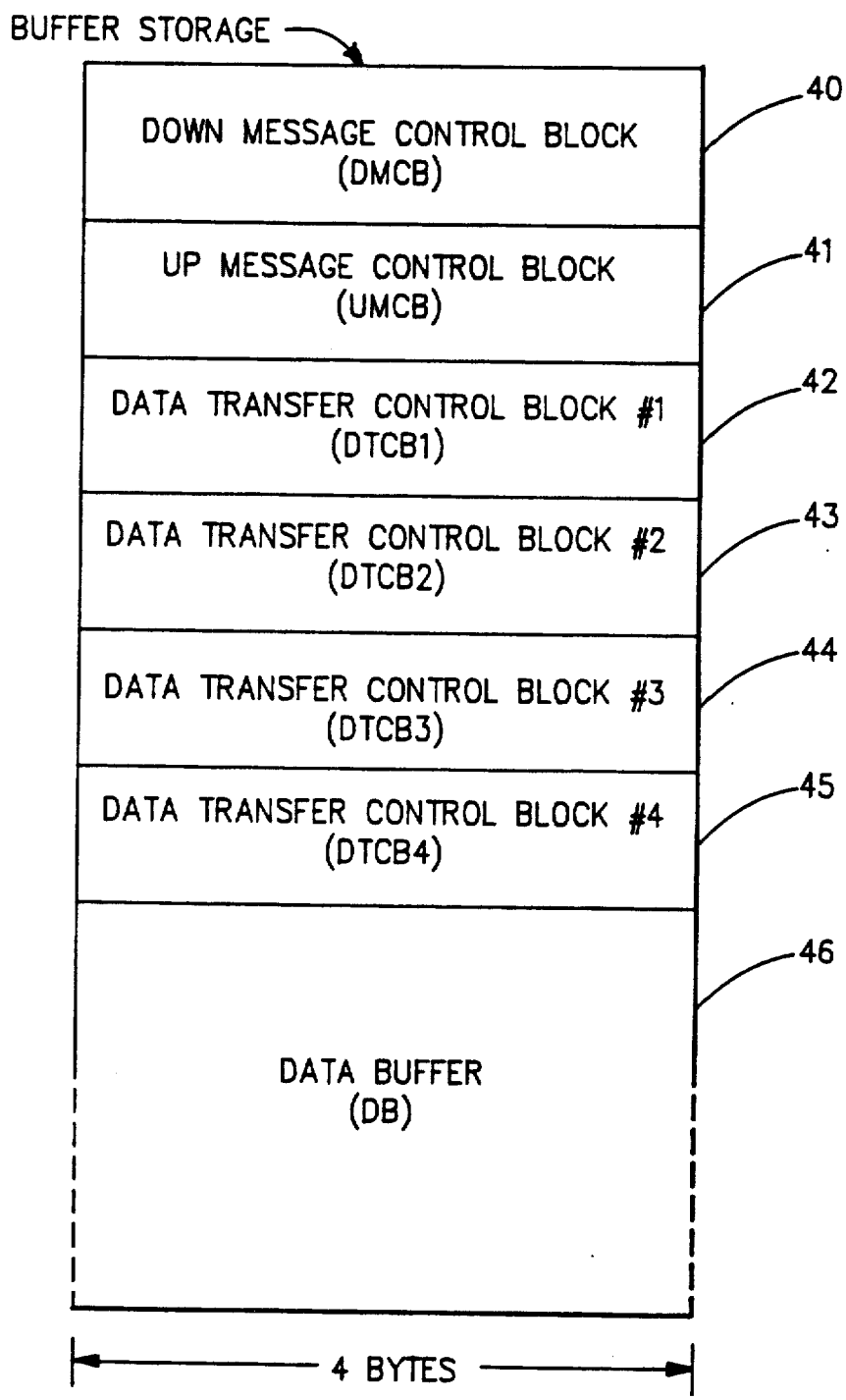
FIG. 2 is a storage map for the buffer storage unit used in the bus-to-bus adapter of FIG. 1.

FIG. 2 shows a storage map for the buffer storage 34. The buffer storage 34 is organized into addressable lines of data (words of data), each line containing four bytes. The lowest address (zero) is at the top of the map and the highest address is at the bottom of the map. The lower most address range of the buffer storage 34 is dedicated for use by a set of relatively small control blocks indicated at 40–45. Each control block area has a few lines or words of storage capacity. The remainder of the buffer storage 34 is comprised of a relatively large data buffer area 46 for temporarily storing the data being transferred. This data buffer area 46 may have a capacity of, for example, 32 kilobytes (8,000 words).

In the present embodiment, the word "down" is used to denote the overall direction of movement for data or messages being moved from the System 370 processor 21 to the PS/2 processor 22. The word "up" is used to refer to the general direction of movement for data and messages transferred from the PS/2 processor 22 to the System 370 processor 21. The down message and the up message control blocks 40 and 41 enable messages to move in only the down direction or the up direction, respectively. Each of the data transfer control blocks (DTCB's) 42–44 is bidirectional in nature. Each is capable of controlling the movement of data in either the down direction or the up direction.

FIGS. 3, 4 and 5 show the format or layout for the information that can be loaded into the control blocks 40, 41 and 42, respectively. As seen some portions of these control block areas are not used or more precisely have not been defined for use. Also, those that have been defined for use (by the presence of a label) are not always used in all cases. The remaining data transfer control blocks 43–45 each have the same format as shown in FIG. 5 for the first data transfer control block 42.

Figure 6:
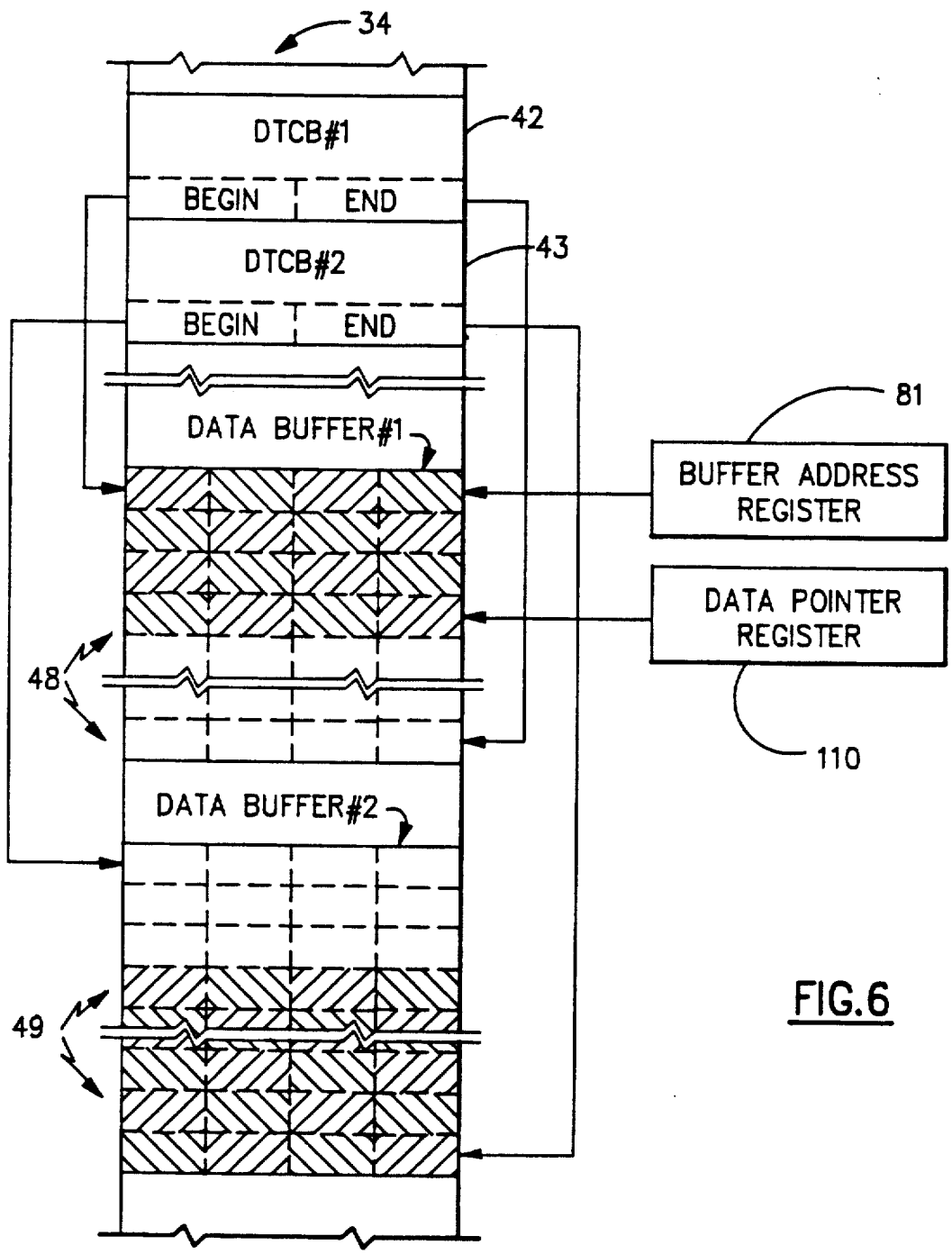
FIG. 6 is a partial storage map for the buffer storage unit of FIG. 2 and illustrates the establishment of multiple independent data buffer areas in the buffer storage unit.

The various data transfer control blocks 42–45 are used to establish and manage separate and independent data buffer areas in the large data buffer area 46 of FIG. 2. The manner in which this is done is illustrated in FIG. 6 for the case of the first two data transfer control blocks 42 and 43. As there seen the first data transfer control block 42 establishes a first data buffer area 48 and the second data transfer control block 43 establishes a separate and different data buffer area 49. The beginning address for the first data buffer area 48 is defined by the data buffer begin address contained in the first two bytes of the last word of the first data transfer control block 42. The ending address for the first data buffer area 48 is defined by the data buffer end address value contained in the last two bytes of the last word of the control block 42. In a similar manner, the begin address and end address values in the second data transfer control block 43 define the starting and ending addresses for the second data buffer area 49. The separate data buffers defined by the various data transfer control blocks may be used for separate and independent processor-to-processor data transfer operations. Thus, for example, the first data buffer may be used for transferring printing data from the System 370 processor 21 to a printer coupled to the PS/2 I/O bus 26–28. At the same time, the second data buffer 49 may be used for transferring data from a disk storage unit coupled to the PS/2 I/O bus 26–28 to the System/370 processor 21 for storage in its storage unit 25. As will be seen, these two different data transfer operations may be performed in a concurrent manner.

It should be noted that all four of the DTCB defined data buffers need not be used during any given period of time. In other words, in any given period, one or more of the data transfer control blocks may not be in use and may not contain any valid information. When any given data transfer control block is not in use, it will not in effect have any data buffer area associated with it. When a data transfer control block is first initialized for use, it may be provided with a data buffer area in any unused portion of the total data buffer area 46 and its size may be any size within reason, that is permitted by the then unallocated portion of the total data buffer 46. Thus, this multiple data transfer buffer arrangement is quite flexible in nature. Also, the present invention is not limited to use of only four data transfer buffers. A greater or lesser number may be used, as conditions may require.

The down message control block 40 and the up message control block 41 shown in FIG. 2 do not establish any data buffer areas in the large data buffer area 46. The information to be transferred is contained in the down message or up message control block itself. If need be, the down message and up message control blocks can be redefined to include one or more additional words.

Figure 7:
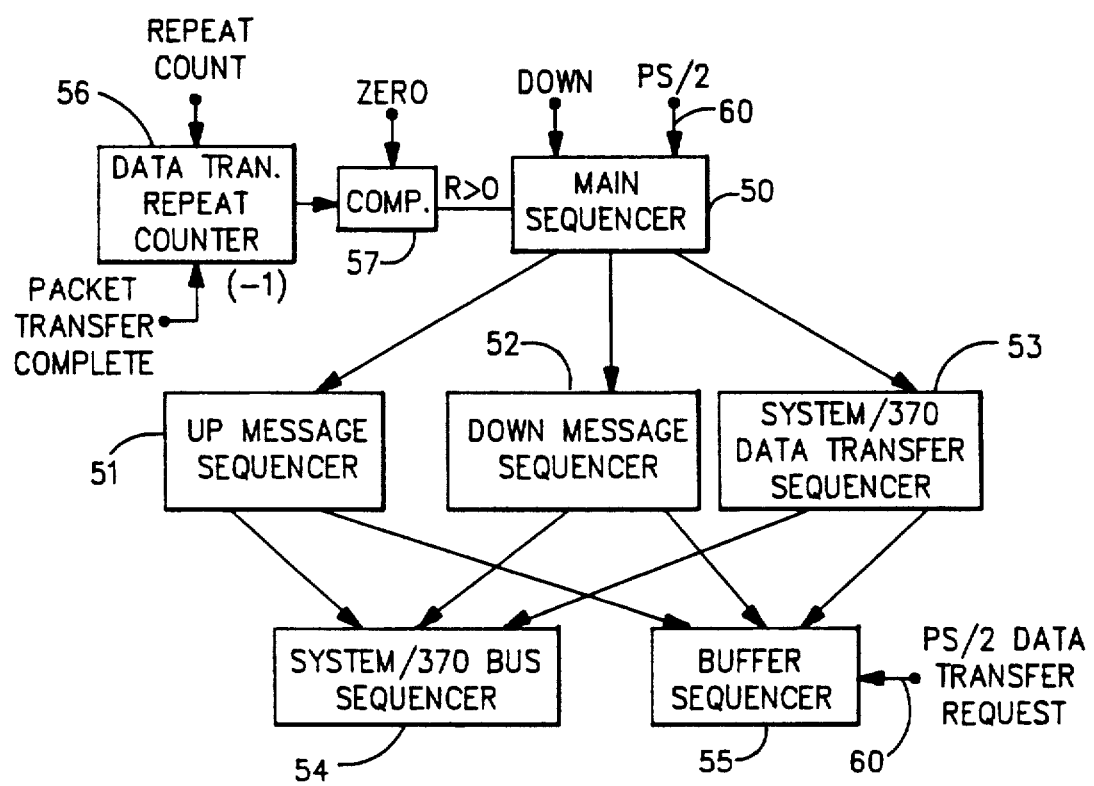
FIG. 7 is a block diagram showing the interrelationship of various sequencer mechanisms used in the adapter control unit of FIG. 1.

The adapter control unit 39 of the bus-to-bus adapter 20 of FIG. 1 includes a set of five hard-wired sequencers for individually controlling different phases of the message and data transfer operations. These sequencers are shown in FIG. 7. A main sequencer 50 selects which one of the following three sequencers is operational at any given moment: an up message sequencer 51; a down message sequencer 52; and a System/370 data transfer sequencer 53. Only one of these three sequencers 51, 52 and 53 can be operational at any given moment.

When operational, the up message sequencer 51 functions to control the buffer storage 34, the bidirectional drivers 37 and the bidirectional address/data register 38 to cause the up message control block 41 to be transferred from the buffer storage 34 to the System/370 processor 21. When operational the down message sequencer 52, on the other hand, serves to transfer a down message (the information contained in the down message control block 40) from the System/370 processor 21 to the down message control block in the storage buffer 34 When active, the System/370 data transfer sequencer 53 operates to transfer a packet of data from the buffer storage 34 to the System/370 processor 21 or vice versa, such data packet being read from or written into the large data buffer area 46.

Each of the sequencers 51–53 normally operates in conjunction with a System/370 bus sequencure 54 and a buffer sequencure 55. The System/370 bus sequencer 54 controls the flow direction through and the loading of data into the bidirectional address/data register 38. It also does the signal transfer handshaking with the System/370 processor 21 and controls the multiplexing and demultiplexing which is required where the address/data bus 23 has a different number of lines than the buffer data bus 36.

The buffer sequencer 55 controls the selective activitation and the flow directions for the bidirectional drivers 35 and 37. This controls the toggling of the buffer data bus 36 between the PS/2 and the System/370 data flow paths. The buffer sequencer 55 also selects the address source and the read/write control source for the buffer storage 34.

The main sequencer 50 selectively of the activates, one at a time, the up message sequencer 51 the down message sequencer 52 and the System/370 data transfer sequencer 53. Main sequencer 50 provides the allocation mechanism which determines how often and how long each of the sequencers 51-53 is activated. The allocation algorithm used in the present embodiment also makes use of a data transfer repeat counter 56 and a comparator 57. The repeat counter 56 is programmable and determines how many packets of data are transferred for each data transfer control block session. For each such session, this counter is initially loaded with the number of packets to be transferred and is decremented by a factor of one each time a packet is transferred. The comparator 57 provides an output control signal which indicates that the count R in the repeat counter 56 is greater than zero. This tells the main sequencer 50 that there are more packets to be transferred for the control block session which is then taken place.

Figure 8:
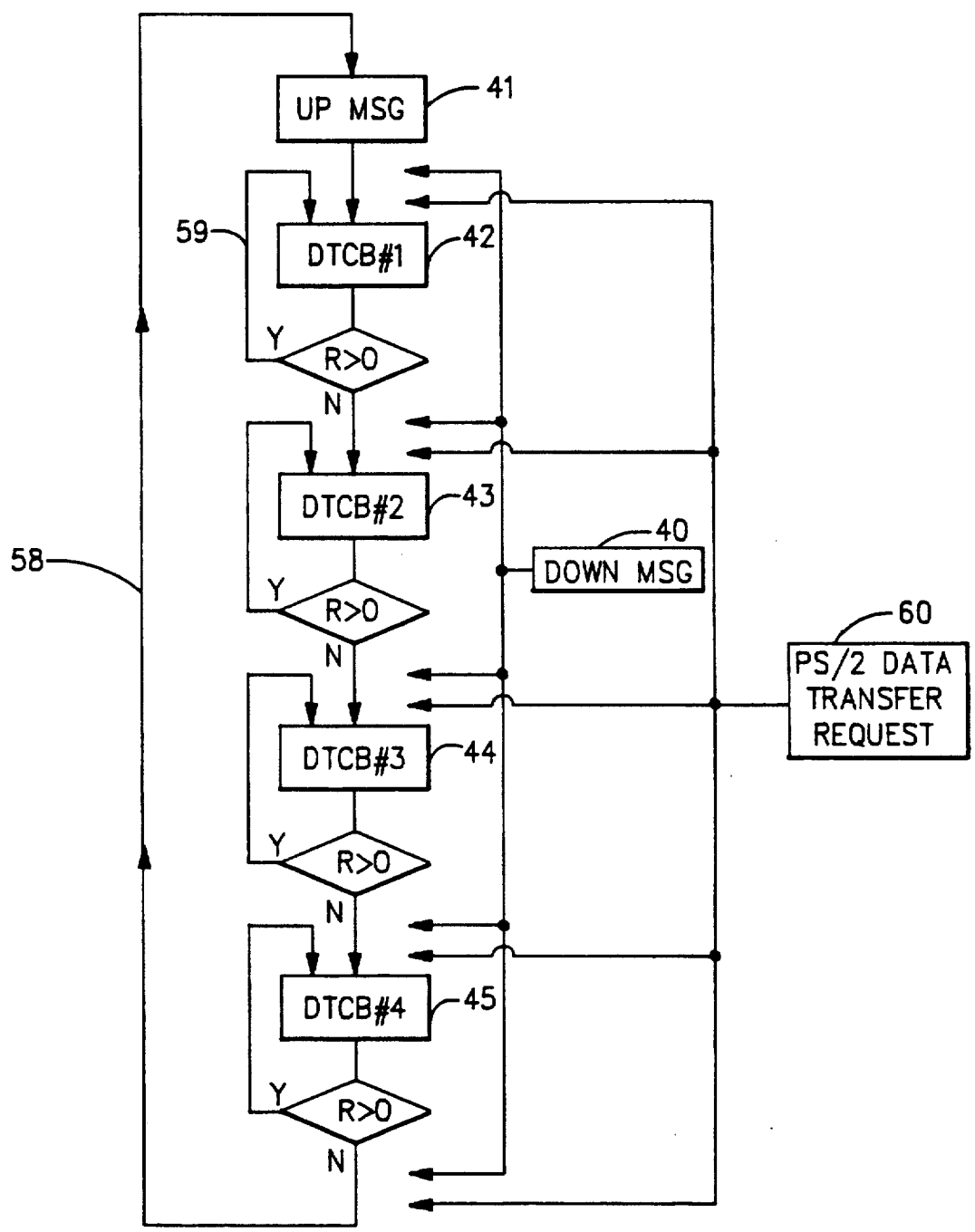
FIG. 8 is a flow diagram showing the order in which the different message and data transfer areas in the buffer storage unit are serviced.

FIG. 8 is a flow diagram showing the service time allocation algorithm implemented in the main sequencer 50. The basic service allocation routine is to service the up message control block 41 and the data transfer control blocks 42–45 one at a time in a round robin fashion, with this basic loop being completed by the flow path 58. The basic routine is for each of the data transfer control blocks to transfer one packet of data each time it is serviced. This can be modified by loading a nonzero count value into the repeat counter 56 of FIG. 7 as one or more of the data transfer control blocks comes up for service. The decision block R>0 appearing at the output of the data transfer control block 42, for example, means that the main sequencer 50 looks at the output of the comparator 57 and asks the question as to whether the repeat counter 56 contains a nonzero value. If the answer is yes, then the feedback path 59 is taken and the data transfer control block 42 is serviced one more time to transfer one more packet of data. If the answer is no, then service is passed to the next data transfer control block 43. Each of the remaining data transfer control blocks 43–45 has the same kind of repeat feedback mechanism. Thus, depending on the repeat count values loaded into repeat counter 56, one or more of the data transfer control blocks 42–45 can be caused to transfer more than one data packet during its data transfer session.

If any of the control blocks 41–45 is inactive when its turn comes up, then control is immediately passed to the next control block in the chain. Each control block contains a status bit which indicates whether or not such control block is active. These status bits are examined by the main sequencer 50 to determine whether or not to move on to the next control block.

The down message control block 40 is given special priority status. It is taken up out of turn and is immediately serviced whenever it becomes active. More precisely, it is serviced just as soon as the currently executing control block plus its repeats gets finished. This is one before going to the next control block in the primary chain. For the case of a data transfer control block which is programmed to transfer more than one packet, the down message control block 40 must wait until after all packets have been transferred before being serviced.

The main sequencer 50 also includes a mechanism for phasing in requests for data transfers between the buffer storage 34 and the PS/2 processor 22. In particular, a PS/2 data transfer request signal 60 is supplied to the main sequencer 50 and such sequencer treats it as a priority request. Such request is serviced intermediate the then executing control block and the next control block in the main chain. A PS/2 request will not, however, break into a repeat count operation being performed by a data transfer control block. When a PS/2 request is being honored, the main sequencer 50 temporarily suspends further operation of the up message, down message and data transfer sequencers 51-53.

Each of the sequencers 51-55 is a hard-wired state machine. Each of these sequencures is like a small dedicated special purpose computer or controller having a hard-wired control program, as opposed to a software or microcode control program. For this reason, faster operation is obtained than could be obtained by using a microprocessor.

The bus-to-bus adapter 20 is completely compatible with the standard System/370 I/O protocol. As is known, System/370 I/O operations are initiated when the application program or the operating system program in the System/370 storage unit 25 issues a "START I/O" instruction. The occurrence of such an instruction causes the System/370 processor 21 to send a channel address word (CAW) to an I/O unit which, in this case, is represented by the PS/2 processor 22. This channel address word is sent to the PS/2 processor 22 by means of a down message control block which, among other things, includes the System/370 storage address of the I/O command to be executed.

In response to this CAW, the PS/2 processor 22 commences to fetch the System/370 channel command word (CCW) from the System/370 storage unit 25. This is accomplished by means of a data transfer control block and its associated data buffer area. In particular, the PS/2 processor 22 initializes a data transfer control block and places the System/370 storage address for the CCW in the data address field of such control block. This data transfer control block then fetches the two CCW words from the System/370 storage unit 25. These CCW or channel command words contain the command code, the starting System/370 data address and the byte count, which byte count designates the number of data bytes to be transferred for this System/370 I/O operation.

The PS/2 processor 22 uses this CCW information to set up a data transfer control block for doing the processor-to-processor data transfer operation specified by the CCW. This processor-to-processor operation may be in either direction. If it is a System/370 data fetch operation, then the requested data is transferred from the System/370 storage unit 25 to the PS/2 storage unit 29. If, on the other hand, it is a System/370 store operation, then data is transferred from the PS/2 storage unit 29 to the System/370 storage unit 25.

After completion of a System/370 I/O operation, the PS/2 processor 22 sends a condition code or status message to the System/370 processor 21 advising it of the status of things at the end of the I/O operation. This is accomplished by way of an up message control block.

Figure 9:
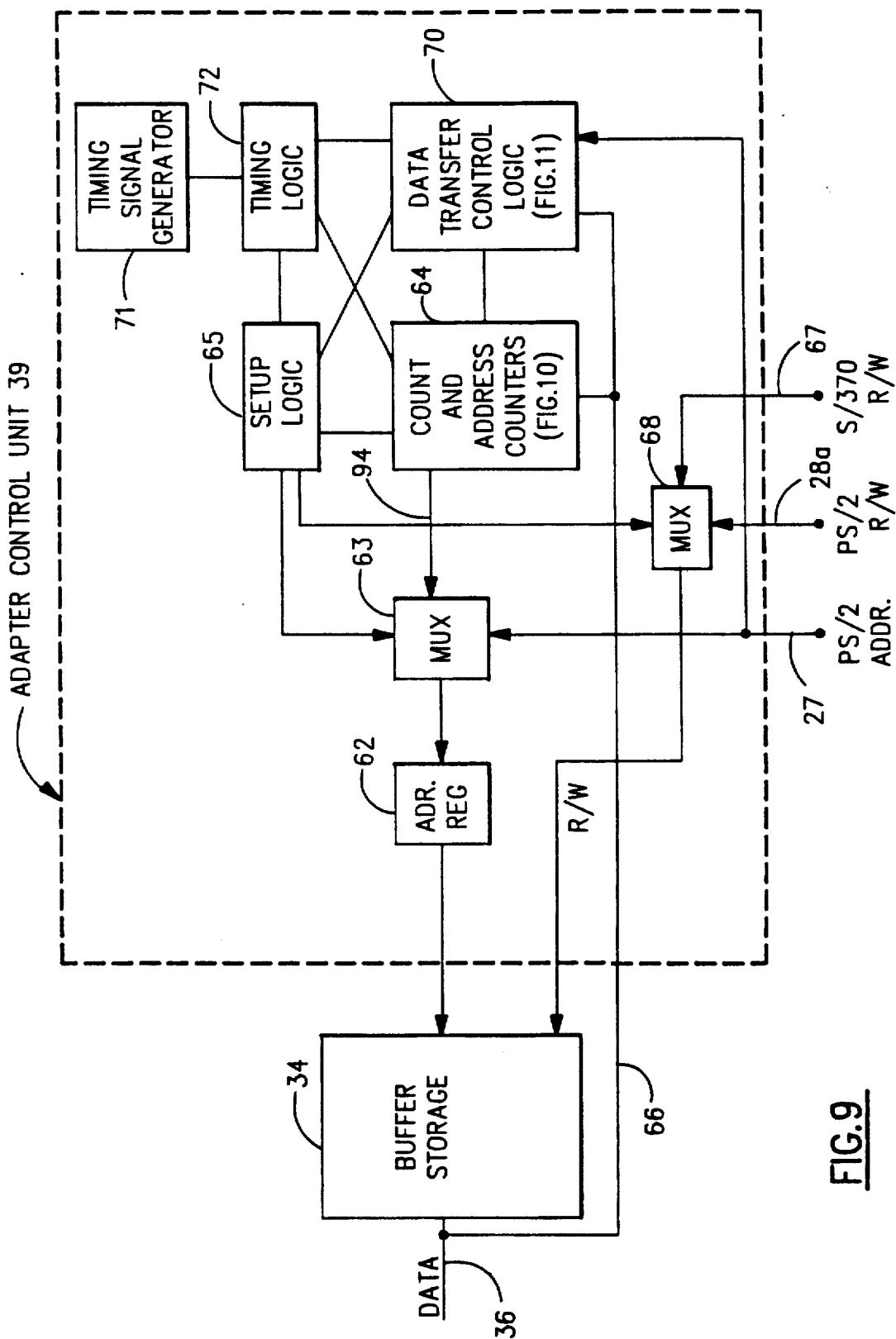
FIG. 9 is a block diagram showing in greater detail the internal construction of the adapter control unit of FIG. 1.

Referring to FIG. 9, there is shown in greater detail a portion of the hardware contained within the adapter control unit 39 of FIG. 1. As seen in FIG. 9, the adapter control unit 39 includes an address register 62 for supplying to buffer storage 34 the address of the word to be accessed. This buffer address may be obtained from anyone of various sources. The source selected at any given moment is controlled by a multiplexer 63. One of the selectable addresses supplied to the multiplexer 63 is the PS/2 address appearing on the PS/2 address bus 27. This address is used when data is being transferred from the PS/2 processor 22 to the buffer storage 34 or vice versa. Another address source connected to the multiplexer 63 is count and address counters 64. As will be seen in connection with FIG. 10 this count and address counter unit 64 includes a buffer address counter mechanism which is used when transferring data from the buffer storage 34 to the System/370 processor or vice versa.

A further address source is setup logic 65. Setup logic 65 is used for addressing the buffer storage 34 for purposes of initializing the count and address counters in unit 64 at the beginning of each data transfer control block operation. This initial setup routine includes the reading of the data buffer begin address, the byte count value and the System/370 data address contained in the data transfer control block and the placing of such values into the appropriate address and count registers in the count and address counter unit 64. These values are transferred to the unit 64 by way of the bus 66 which is connected to the buffer data bus 36. This mechanism is also used for storing status and update values back into the data transfer control block at the end of the current data transfer control block session.

The adapter control unit 39 also includes means for selecting the source of the read/write (R/W) control signal which is supplied to the buffer storage 34. This read/write control signal may be obtained from anyone of the following sources: a control line 28a in the PS/2 control bus 28, a System/370 transfer control signal appearing on line 67 obtained from one of the message/data sequencers 51-53, and the setup logic 65. The selection of the appropriate read/write signal source is accomplished by a multiplexer 68.

The adapter control unit 39 also includes data transfer control logic 70 (details shown in FIG. 11), a timing signal generator 71 and timing logic 72. In response to timing signals from the generator 71, timing logic 72 supplies appropriate timing pulses to the remainder of the hardware for doing things like loading registers, incrementing and decrementing counters, enabling signal path control gates, etc.

The count and address counter unit 64 and the data transfer control logic 70 constitute the major portion of the System/370 data transfer sequencer 53 of FIG. 7. Address register 62 and multiplexers 63 and 68 represent part of the hardware contained in the buffer sequencure 55 of FIG. 7. FIG. 9 shows only a portion of all of the hardware included in the adapter control unit 39. What is shown is sufficient for a good understanding of the primary features of the present invention.

Figure 10:
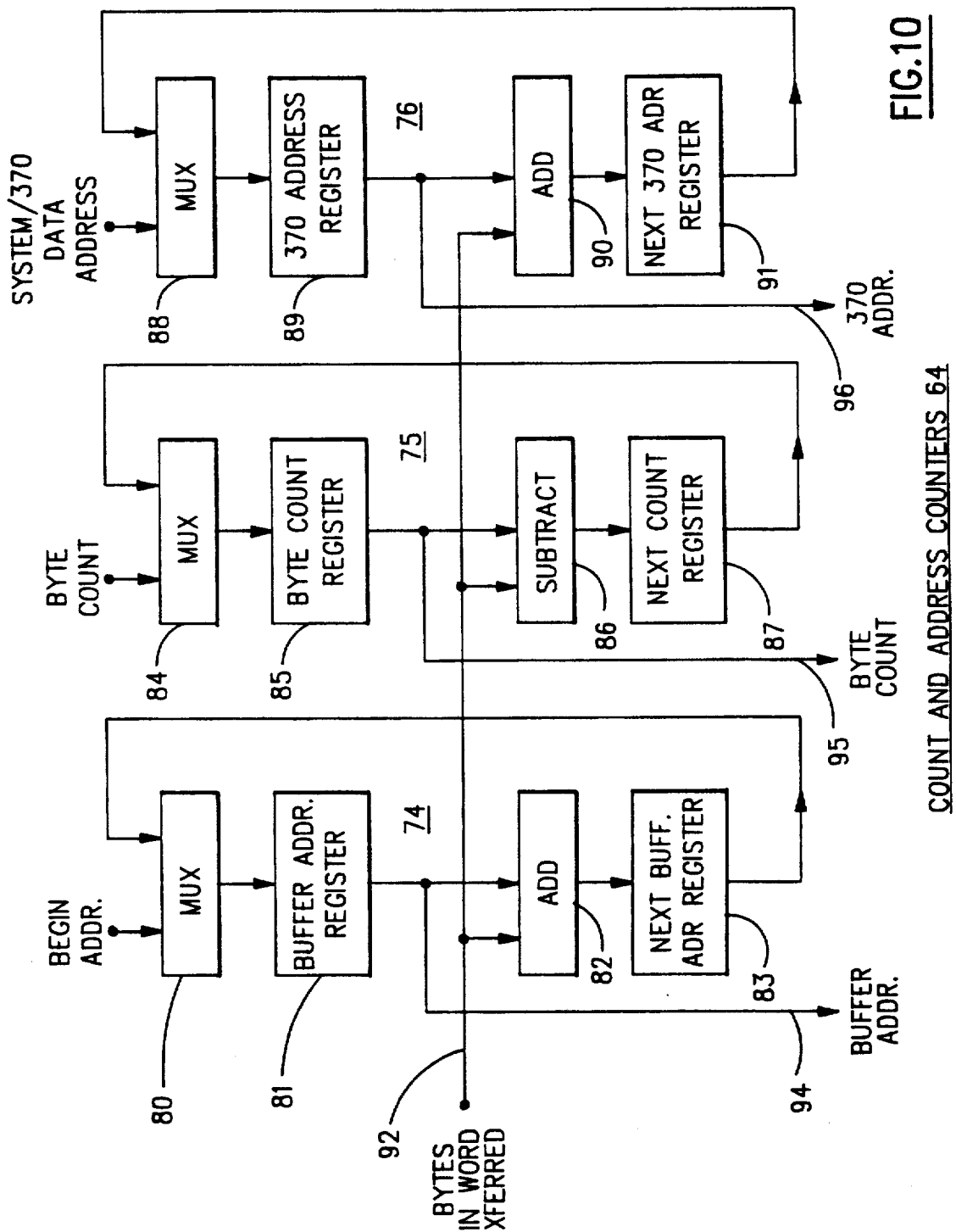
FIG. 10 is a block diagram showing in greater detail the internal construction of the count and address counters of FIG. 9.

Referring to FIG. 10, there shown in greater detail the internal construction of the count and address counters 64 of FIG. 9. As seen in FIG. 10, these include a buffer address counter 74, a byte count counter 75 and a System/370 storage address counter 76. These counters are used when transferring data from the System/370 storage unit 25 to the adapter buffer storage 34 or vice versa.

The buffer address counter 74 includes a multiplexer 80, a buffer address register 81, an adder 82 and a next buffer address register 83. At the beginning of each data transfer control block session, the beginning or starting address for the data is read out of the buffer storage 34 and loaded into the buffer address register 81 via multiplexer 80. The address in register 81 is supplied to a first input of an adder 82. Data is transferred to or from the System/370 processor in a word-by-word manner. Adder 82 adds to the current buffer address a number value corresponding to the number of valid bytes in the word currently being transferred to or from the System/370 processor 21. This produces an updated buffer address which is the address of the next word to be accessed from the buffer storage 34. This next address is loaded into the register 83. At the completion of the current word transfer, the next address in register 83 is loaded into the register 81 (via multiplexer 80) to provide in register 81 the new current buffer address. The current buffer address in register 81 is supplied to the multiplexer 63 of FIG. 9 via bus 94 for purposes of addressing the buffer storage 34. The use of the next buffer address register 83 enables the updated address to be generated while the current word transfer is in progress. This speeds up the overall operation of the buffer address counter 74.

The byte count counter 75 includes multiplexer 84, byte count register 85, subtracter 86 and next count register 87. At the beginning of each data transfer control block session, the byte count value is transferred from buffer storage 34 and loaded into the byte count register 85 via multiplexer 84. This byte count is supplied to the subtracter 86 which subtracts therefrom the number of valid bytes in the word currently being transferred. This produces and updated byte count which is loaded into the next count register 87. At the end of the current word transfer, this next count value is loaded into the byte count register 85 to become the new byte count. In this manner, the byte count register 85 is caused to contain a count of the number of bytes remaining to be transferred to or from the System/370 processor. Overlapping the execution of the current word transfer with the generation of the next count value speeds up the operation of the byte count counter 75.

The System/370 address counter 76 includes a multiplexer 88, a System/370 address register 89, an adder 90 and a next System/370 address register 91. At the beginning of each data transfer control block session, the System/370 data storage address is read out of the buffer storage 34 and loaded into the System/370 address register 89 via multiplexer 88. This is the address in the System/370 storage unit for the word currently being transferred to or from the System/370 processor. This current address is updated by the adder 90 and the resulting updated address is loaded into the next address register 91. At the end of the current word transfer, the next address in register 91 is loaded into the current address register 89 to become the new current address.

As will be seen, the byte value for the current word, which is supplied via bus 92 to the adders 82 and 90 and the subtracter 86, is obtained from the data transfer control logic 70. This byte number value on bus 92 can be one, two, three or four, depending on the number of valid bytes contained in the word currently being transferred.

Figure 11:
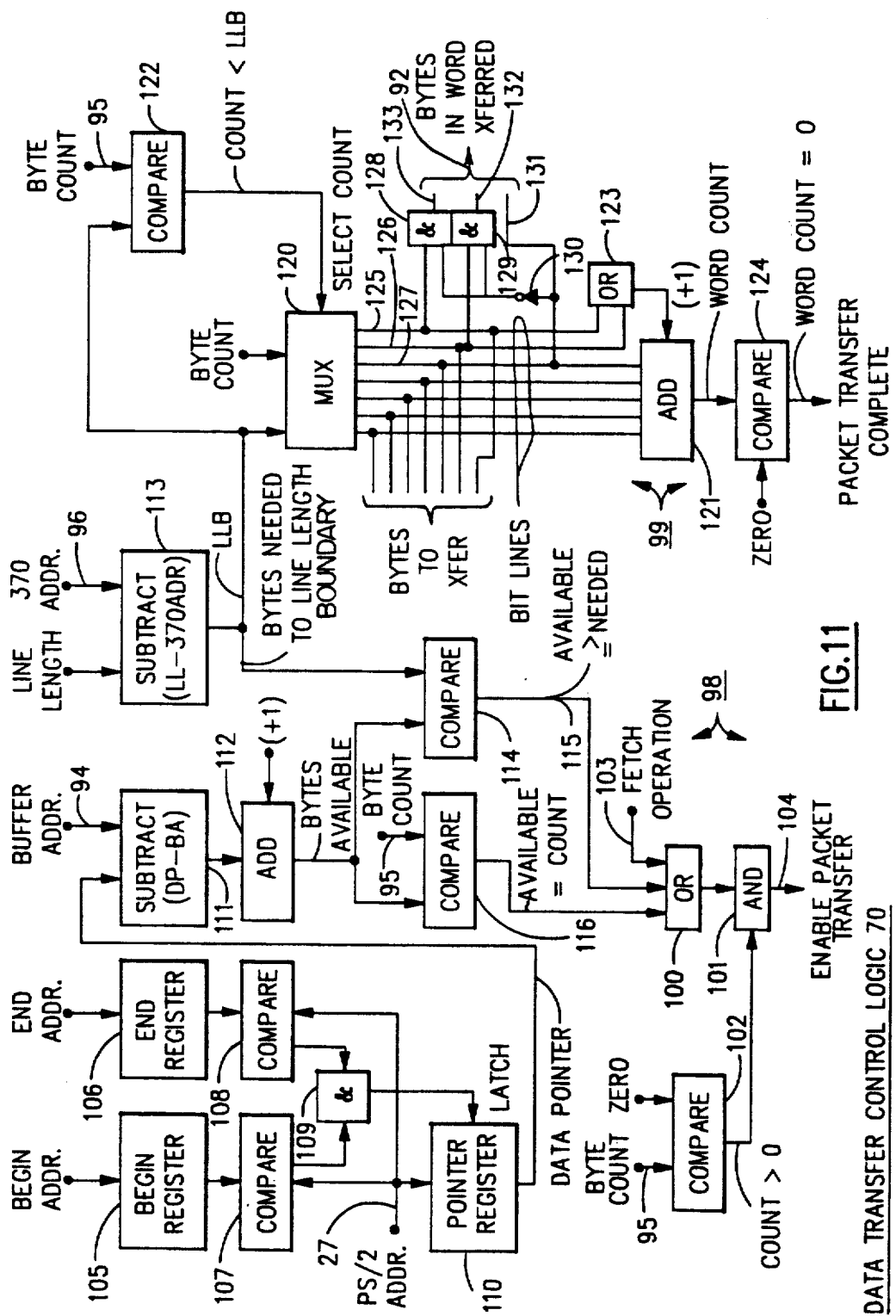
FIG. 11 shows in greater detail the internal construction of the data transfer control logic of FIG. 9.

The following counter values are supplied to the data transfer control logic 70 of FIG. 11. : the current buffer address via bus 94; the current byte count via bus 95; and the current System/370 data address via bus 96. These address and count values are, of course, constantly changing as more and more data is transferred to or from the System/370 processor.

Referring to FIG. 11, there is shown in greater detail the internal construction of the data transfer control logic 70 of FIG. 9. This data transfer control logic includes a transfer enable portion 98 and a word counter portion 99. For the case of a fetch operation (transfer of data from System/370 storage 25 to buffer storage 34), this transfer enable mechanism includes the transfer enable mechanism includes an OR circuit 100, an and circuit 101 and a comparator 102. If the fetch operation signal is active (line 103 high) and if the byte count supplied to comparator 102 is greater than zero, than an ENABLE PACKET TRANSFER signal is produced on the output line 104 of and circuit 101. This ENABLE signal tells the main sequencer 50 that the control block transfer operation is ready and tells the System/370 bus sequencure 54 to commence the actual transfer of data.

For the case of a System/370 store operation buffer storage 34 to System/370 storage 25 (data transfer) the actual transfer of data is held in abeyance until there is sufficient data in the buffer storage 34 to support at least one packet transfer operation. Each store operation transfers a packet of data from the buffer storage 34 to the System/370 storage 25. Depending on where the System/370 storage address is relative to the next line length boundary in the 370 storage, the packet transferred may be either a partial packet or a complete packet. The System/370 storage line length is the length or amount of data that the System/370 storage is designed to handle during a single access of the System/370 storage unit. For sake of example herein, it is assumed that the System/370 storage line length is 64 bytes. In this case, a complete packet of data contains 64 data bytes.

Where a complete 64-byte packet of data is to be transferred, the transfer enable mechanism 98 holds the commencement of the actual transfer in abeyance until there are at least 64 bytes of data in the buffer storage 34. If less than a complete packet is needed to reach the next line length boundary in System/370 storage, then the actual commencement of transfer is held in abeyance until the buffer storage 34 contains a sufficient number of data bytes to reach the next line length boundary. In this regard, when the initial System/370 data address does not coincide with a storage line length boundary, the first packet transferred will be a partial packet having the proper number of data bytes to fill the System/370 storage to the next line length boundary. Thereafter, complete packets will be transferred to the System/370 storage until the last packet is reached. Such last packet may be a partial packet.

In the presence embodiment there is provided a transfer overlap feature for commencing the transfer of data to the System/370 processor in an overlapping manner relative to the receipt by the buffer storage 34 of data from the PS/2 processor. In other words, for a given data transfer control block operation, a mechanism is provided for allowing removal of data from a given data buffer area before all incoming data for such data buffer area has arrived. The previously known way of doing a data transfer was to wait until all the data for the transfer had arrived in the buffer storage before commencing the removal and movement of the data to the second processor. Use of the present overlap mechanism serves to speed up the movement of the data from the PS/2 processor to the System/370 processor.

From many data transfer operations, the amount of data to be transferred will be considerably in excess of the amount (64 bytes) contained in a single packet With the overlap mechanism, the transfer of packets to the System/370 storage 25 can commence before all the "packets" have been received from the PS/2 Processor 22, (Actually, the transfers from the PS/2 processor to the buffer storage are not done on a "packet" basis).

The transfer overlap mechanism for buffer storage to System/370 transfers includes a begin register 105, an end register 106, a comparator 107, a comparator 108 an AND circuit 109 and a data pointer register 110. At the start of a data transfer control block operation, the begin register 105 is loaded with the data buffer begin address contained in the data transfer control block. Similarly, the end register 106 is loaded with the data buffer end address contained in the data transfer control block. As indicated in FIG. 6, these begin and end addresses defined the limits of the data buffer area to be used for the transfer. The PS/2 processor 22 thereafter commences to transfer data into the buffer storage 34. During this PS/2 to buffer transfer, the buffer storage 34 is addressed by the PS/2 address bus 27. As each PS/2 address value is received, it is compared with the begin and end addresses by the comparators 107 and 108, respectively. If the PS/2 address value falls within the acceptable buffer storage address range for the data buffer area in question, then the AND circuit 109 produces an output signal which latches the PS/2 address into the pointer register 110. As indicated in FIG. 6, this data pointer points to the address in the data buffer area which is just now being filled with data received from the PS/2 processor.

The data pointer address in register 110 is supplied to a first input of a subtracter on 111. The buffer address in the buffer address register 81 is supplied to the second input. Subtractor 111 subtracts the buffer address from the pointer address and supplies the results to an adder 112 which adds a count of one to this difference value. The resulting value at the output of adder 112 represents the number of data bytes that are available in the buffer storage data buffer area that is being used. Initially, the buffer address corresponds to the location of the first word in the DTCB data buffer area for the data transfer control block being considered. This is the case shown in FIG. 6.

Another calculation that is done is to determine the number of data bytes needed to reach the next line length boundary in the System/370 storage 25. This calculation is performed by a subtracter 113 which subtracts the lower order address bits of the System/370 storage address from the line length value. The line length value is a constant for any given System/370 storage unit. In the present example, the line length is assumed to be 64 bytes. Thus, in the present example, it is sufficient to subtract the six lower order address bits of the 370 address from the line length value. The value appearing at the output of subtracter 113 represents the number of bytes needed to fill the System/370 storage unit to the next line length boundary.

A comparator 114 is used to compare this bytes needed value with the bytes available value appearing at the output of adder 112. If the number of bytes available in the buffer storage data buffer area is equal to or greater than the number of bytes needed to reach the next line length boundary, then the output line 115 of the comparator 114 goes high. This high signal on line 115 is supplied by way of OR circuit 100 and AND circuit 101 to produce the ENABLE PACKET TRANSFER signal on the output line 104. This then enables the commencement of a packet transfer from the buffer storage 34 to the System/370 storage 25 even though additional data bytes remain to be received by the buffer storage 34 from the PS/2 processor 22.

There is another condition where the ENABLE PACKET TRANSFER signal will appear on the output line 104. This condition is fulfilled any time the number of bytes available becomes equal to the byte count in the byte count register 85 (FIG. 10). Such an occurence means that all the data bytes have been transferred from the PS/2 processor to the buffer storage 34. The existence of this condition is determined by means of a comparator 116. If the two inputs to the comparator 116 become equal then its output line goes high and the ENABLE PACKET TRANSFER signal on line 104 is turned on, if it is not already turned on for some other reason.

Eventually, after all of the data bytes to be transferred have been transferred from the buffer storage 34 to the System/370 storage 25, the byte count in byte count register 85 assumes a value of zero. This causes the output of comparator 102 to go to zero which turns off the AND circuit 101 and removes the ENABLE PACKET TRANSFER signal from the output line 104.

Considering now the word counter 99 portion of the data transfer control logic 70, such word counter mechanism first determines the number of bytes needed for the upcoming data packet to be transferred and then determines from this value the number of words needed to transfer this data packet to the System/370 storage 25.

To this end, the bytes needed value from the subtracter 113 is supplied to a first input of a multiplexer 120. The lower order bit lines from the byte count register 85 are supplied to the second input of the multiplexer 120. The multiplexer 120 selects one or the other of these two inputs and supplies same to an adder 121. The multiplexer input that is selected is controlled by a comparator 122. Comparator 122 compares the byte count with the bytes needed to reach the next line length boundary and if the byte count is less than the number of bytes needed, than the output of comparator 122 goes high and the byte count input of multiplexer 120 is selected to provide the input to adder 121.

For most data transfers, the byte count will be greater than the bytes needed until the tail end of the data transfer process is reached. As long as the byte count is greater, the size of the data packet to be transferred will correspond to the number of bytes needed to reach the next line length boundary. When the tail end of the data transfer is reached, there may be a few bytes left remaining which are lesser in number than those needed to reach the next line length boundary. In this case, the multiplexer 120 is switched to supply the byte count to the adder 121. In effect, the output of multiplexer 120 represents the number of bytes which will actually be included in the next packet to be transferred.

As each word is transferred to the System/370 processor, the System/370 address value will be increased by the number of valid bytes in the transferred word. As a result of this increase in the 370 address value, the output of subtracter 113 will be decreased by a like amount to show the actual number of bytes remaining to be needed to reach the line length boundary.

The adder 121 provides an output value representing the number of words remaining to be transferred in the current data packet. Initially, this word count value at the output of adder 121 corresponds to the total number of data words to be included in the packet. As each word is transferred, this value is reduced to represent the number of words remaining to be transferred.

The adder 121 divides the byte value at the output of multiplexer 120 by a factor of four by the simple expedient of omitting the two lowest order multiplexer output bits from its input. The third bit line from the right of the multiplexer output is treated as the least significant bit at the output of the adder 121. The OR circuit 123 is provided to cover the case where the word being transferred includes less than four valid data bits. When this occurs, one or both of the two least significant bits from multiplexer 120 will be at the binary one level and a count of one is added by the OR circuit 123 to the number supplied to the input of the adder 121. In other words, if an incomplete word is to be transferred, the adder 121 is told to add in one full word count to reflect the total number of partial and complete words to be transferred.

The output of adder 121 is monitored by a comparator 124 to compare the number of words remaining to be transferred with a numerical value of zero. When the number of words or word count reaches a value of zero, the output line of comparator 124 goes high to provide a PACKET TRANSFER COMPLETE signal. This signal is supplied to the main sequencer 50 to tell it to move on to its next step.

Following completion of a packet transfer, the data buffer address field, the byte count field and the System/370 data address field in the data transfer control block are updated to correspond to the values residing in, respectively, the buffer address register 81, the byte count register 85 and the 370 address register 89 at the completion of the packet transfer. This updating is needed so that the System/370 data transfer sequencer will know where to start the next time this particular data transfer control block is serviced for purposes of transferring additional packets to the System/370 storage unit.

The three lowest order output lines from the multiplexer 120 are also used to generate the update number to be supplied by way of bus 92 to the count and address counters in FIG. 10. This update number can have a value of one, two, three or four, depending on the number of valid bytes in the word to be transferred. If four valid bytes are to be included in the word, then the two least significant bit lines 125 and 126 will each have a binary value of zero. And the next higher bit line 127 will have a binary value of one. This means that update lines 131-133 will have a binary value of 100. This corresponds to a decimal value of four. If less than four bytes are to be included in the word, then the binary coding of lines 131-133 will represent the actual number of valid bytes. These lines 131-133 make up to the bus 92 which runs to the count and address counters of FIG. 10. Inverter circuit 130 is provided to prevent the update value on lines 131-133 from exceeding a value of four.

Operation of the Illustrated Embodiment

There will first be considered the case of a data transfer operation wherein data is transferred from the PS/2 processor 22 to the System/370 storage unit 25. The PS/2 processor initiates this type of data transfer operation. Normally it will do this as a result of the System/370 I/O protocol events which occurred earlier. The first step in this transfer process is for the PS/2 processor 22 to set up a data transfer control block in the buffer storage 34. For this purpose, the buffer storage 34 is addressed by way of the PS/2 address bus 27, the multiplexer 68 and the address register 62. The information to be written into the data transfer control block is supplied by way of the PS/2 data bus 26 and the bidirectional drivers 35. The second set of bidirectional drivers 37 are disabled at this time. For sake of example, it is assumed that the data transfer control block which is being set up is the first data transfer control block 42.

It is further assumed that the data buffer area associated with this control block is the data buffer area 48 shown in FIG. 6.

Following completion of the control block set'up and if the transfer overlap feature is not used, then the PS/2 processor would commence to transfer data to the buffer storage data buffer area 48 by way of the PS/2 data bus 26, the buffer storage addressing being accomplished by way of the PS/2 address bus 27. In the absence of the transfer overlap feature, this data transfer would continue until all of the bytes specified in the control block byte count were transferred to the data buffer area 48. On the other hand, if the transfer overlap feature is used, then all of the data need not be transferred to the data buffer 48 at this time. For a fairly large total byte count, only a few packets worth of data may be transferred initially. The amount to be transferred initially is determined by the programming of the PS/2 microcode.

Assuming the transfer overlap feature to be operative and that a few initial packets worth of data have been transferred to the data buffer 48, then the PS/2 processor 22 proceeds to turn on the GO bit in the transfer status field of the control block 42. The next time the main sequencer 50 reaches the data transfer control block 42 position in its scanning cycle, it looks at this GO bit and since the GO bit is turned on, the main sequencer tells the System/370 data transfer sequencer 53 to commence the System/370 transfer operation.

In response to this start signal, the setup logic 65 (FIG. 9) performs the initial set up of the count and address counters 64 and the data transfer control logic 70. In particular, the various address and count values are read out from the control block 42 and set into the appropriate registers in units 64 and 70. Following this initial setup, the data transfer sequencer causes the beginning System/370 data address to be supplied to the System/370 processor. In particular, the data sequencer 53 causes a select word to be transferred to the System/370 processor. This select word contains the three-byte System/370 data address and a 6-bit data length field which is coded to indicate the number of bytes that will be included in the data packet. This data length value is obtained from the output of the multiplexer 120.

The System/370 bus sequencer 54 therafter proceeds to cause word after word of data to be transferred to the System/370 processor 21 until the entire first packet of data has been so transferred. Typically, this packet will contain 16 words (64 bytes) of data. This data is transferred one word at a time to the System/370 processor via the System/370 address/data bus 23.

After transfer of the first packet is completed, the main sequencer 50 is notified and the repeat counter 56 is checked to see if another packet is to be transferred. All packets required to be transferred by the repeat counter 56 are thereafter transferred one at a time to the System/370 storage 25. When the repeat counter 56 goes to zero, the main sequencer 50 instructs the data transfer sequencer 53 to update the information in the data transfer control block 42 to reflect the address and count conditions existing at the end of this operation. When this is finished, the main sequencer 50 move on to the next control block to see if it needs service.

Eventually, the main sequencer 50 will return to the data transfer control block 42 and check to see if its associated data buffer 48 has further data to be transferred. If it does, then the foregoing process is repeated. In particular, the setup logic 65 again initializes the count and address counters 64 and the data transfer control logic 70 with the appropriate values then residing in the data transfer control block 42. Another System/370 data address select word is sent to the System/370 processor, after which another packet of data is transferred to the System/370 processor. Further data packets are thereafter transferred to the System/370 processor if so required by repeat counter 56. This counter 56 receives its initial count value from the repeat count field in the data transfer control block 42.

A new System/370 data address select word is sent to the System/370 processor immediately preceeding the transfer of each additional packet of data.

The foregoing process is repeated each time the main sequencer 50 cycles back around to the data transfer control block 42 position. When the byte count field in the control block 42 eventually reaches zero, this indicates that the overall data transfer operation has been completed for the data transfer control block 42.

Upon completion of the overall data transfer operation, the GO bit in the control block 42 is turned off and an interrupt line in the PS/2 control bus 28 is activated to tell the PS/2 processor that the data transfer operation has been completed. The appropriate interrupt handler routine in the PS/2 microcode then proceeds to read the various status fields in the data transfer control block 42 to determine the success of the data transfer operation. The previously activated interrupt request line is then reset. Following this, the data transfer control block 42 is free for use to perform some other and different data transfer operation.

Considering now the case of a data transfer operation in the down direction, namely, a data transfer from the System/370 storage 25 to the PS/2 storage 29, the first step is for the PS/2 processor to set up an appropriate one of the data transfer control blocks which is not presently in use. For sake of an example, it is assumed that the first data transfer control block 42 is not in use. Thus, as the first step the PS/2 processor writes the various necessary information into the data transfer control block 42 and turns on the GO bit in the control block transfer status field. The next time the main sequencer 50 cycles around to this transfer control block 42 position, it sees that the GO bit is turned on and instructs the data transfer sequencure 53 to commence a control block 42 data transfer. In this case, the data transfer sequencer 53 fetches the appropriate data from the System/370 storage unit 25 and deposits this data in the buffer storage 34. This process is similar to the up transfer process in terms of the sequence of events. In particular, one data packet at a time is transferred until the count in the repeat counter 56 is exhausted. The transfer operation is then temporarily suspended until the main sequencer 50 again cycles back to the control block 42 position. At that time, additional packets of data are transferred from the System/370 storage unit 25 until the repeat count in counter 56 is again exhausted. The data transfer operation is then temporarily suspended until the main sequencer 50 cycles back around to the control block 42 position. This process is repeated over and over again, if necessary, until the byte count in the data transfer control block is exhausted. When the last data packet is eventually transferred to the buffer storage 34, the GO bit in the control block is turned off and an interrupt request is sent to the PS/2 processor to signal that the data transfer operation has been completed. The PS/2 processor then reads the status fields in the data transfer control block to determine the success of the data transfer operation into the buffer storage 34 and resets the interrupt request from the data transfer sequencer.

If the data transfer operation to the buffer storage 34 was successful, then the PS/2 processor thereafter proceeds to fetch the data from the buffer storage 34 and to put it into the PS/2 storage unit 29. For this phase of the operation, the addressing of the buffer storage 34 is accomplished by way of the PS/2 address bus 27, the multiplexer 63 and the address register 62. The data is moved one word (four bytes) at a time from the buffer storage 34 to the PS/2 storage 29 via the buffer data bus 36, the bidirectional drivers 35 and the PS/2 data bus 26. After all of the data is retrieved from the buffer storage 34, the data transfer control block 42 is again free for use in performing some other and different data transfer operation. Since four different data transfer control blocks are available in the buffer storage 34, up to four different and independent data transfer operations may be carried on in a concurrent manner. Also, since different appropriate values may be set into the repeat counter control field of each data transfer control block, different amounts of service time may be allocated to different data transfer operations. This enables the data transfer performance for different types of data transfer operations to be optimized as much as possible in accordance with system requirements. Also, since messages are not processed until the repeat count reaches zero, this allows the data transfer performance to be adjusted so that a certain data rate may be maintained even if message passing interuptions are fairly frequent.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A communications adapter for coupling a first data processor to a second data processor, said communications adapter comprising:

buffer storage means for receiving and storing data supplied by said first data processor at a time, rate and location controlled by said first data processor, which data is en route to said second data processor;

transfer control means, coupled to said buffer storage means, for tracking the amount and location of said data received from said first data processor and stored in said buffer storage means, dynamically packetizing said data, and transferring a resultant packet of said data from said buffer storage means to said second data processor when said buffer storage means contains enough of said data to form said resultant packet, said transfer control means transferring said data from said first data processor to said buffer storage means in units or blocks of different size than said resultant packet, said transfer control means continuing the transfer of additional data from said first data processor to said buffer storage means while packetizing said data into said resultant packet and transferring said resultant packet of data from said buffer storage means to said second data processor; and wherein a capacity of said buffer storage means for said data received from said first data processor is many times greater than a size of one of said packets; and said first data processor has a different architecture than said second data processor, the architecture of said second data processor usually requiring receipt of data in said resultant packets whereas the architecture of said first data processor not requiring transmission of data in said resultant packets.

2. A communications adapter as set forth in claim 1 wherein said transfer control means transfers additional packets of said data from said buffer storage means to said second data processor when said buffer storage means contains enough of said data to form said additional packets.

3. An adapter as set forth in claim 2
wherein said transfer control means includes means for establishing a first data buffer area in said buffer storage means for transfer of one type of data from said first data processor to said second data processor, and a second data buffer area in said buffer storage means for transfer of another type of data from said first data processor to said second data processor; and further comprising means for selecting a first number of packets of data to be transferred from said first data buffer area to said second data processor, and selecting a second number of packets of data to be transferred from said second data buffer area to said second data processor; and wherein said transfer control means is coupled to receive the selections of said first number and said second number, transfers said first number of packets of data from said first data buffer area to said second processor, then halts transfer of packets from said first data area to said second data processor even if there is sufficient data in said first data buffer area to form an additional packet, and then transfers said second number of packets of data from said second data buffer area to said second processor.

4. An adapter as set forth in claim 2 further comprising means for disabling said transfer control means from transferring said packets of data to said second data processor such that data received by said buffer storage means from said first data processor accumulates in said buffer storage means, and receiving an enable for said transfer control means to enable said transfer control means to transfer to said second data processor in packets said data accumulated within said buffer storage means.

5. An adapter as set forth in claim 1 wherein said transfer control means interleaves the transfer of said packet of data from said buffer storage means to said second data processor with the transfer of said additional data from said first data processor to said buffer storage means.

* * * * *